Aug. 15, 1944.   E. T. WEEKS ET AL   2,356,111
VEHICLE WHEEL BRAKE
Filed May 9, 1942   5 Sheets-Sheet 1

Inventors
ELMER THEODORE WEEKS
FAYE M. McCULLEY,

By  Clarence A. O'Brien
Attorney

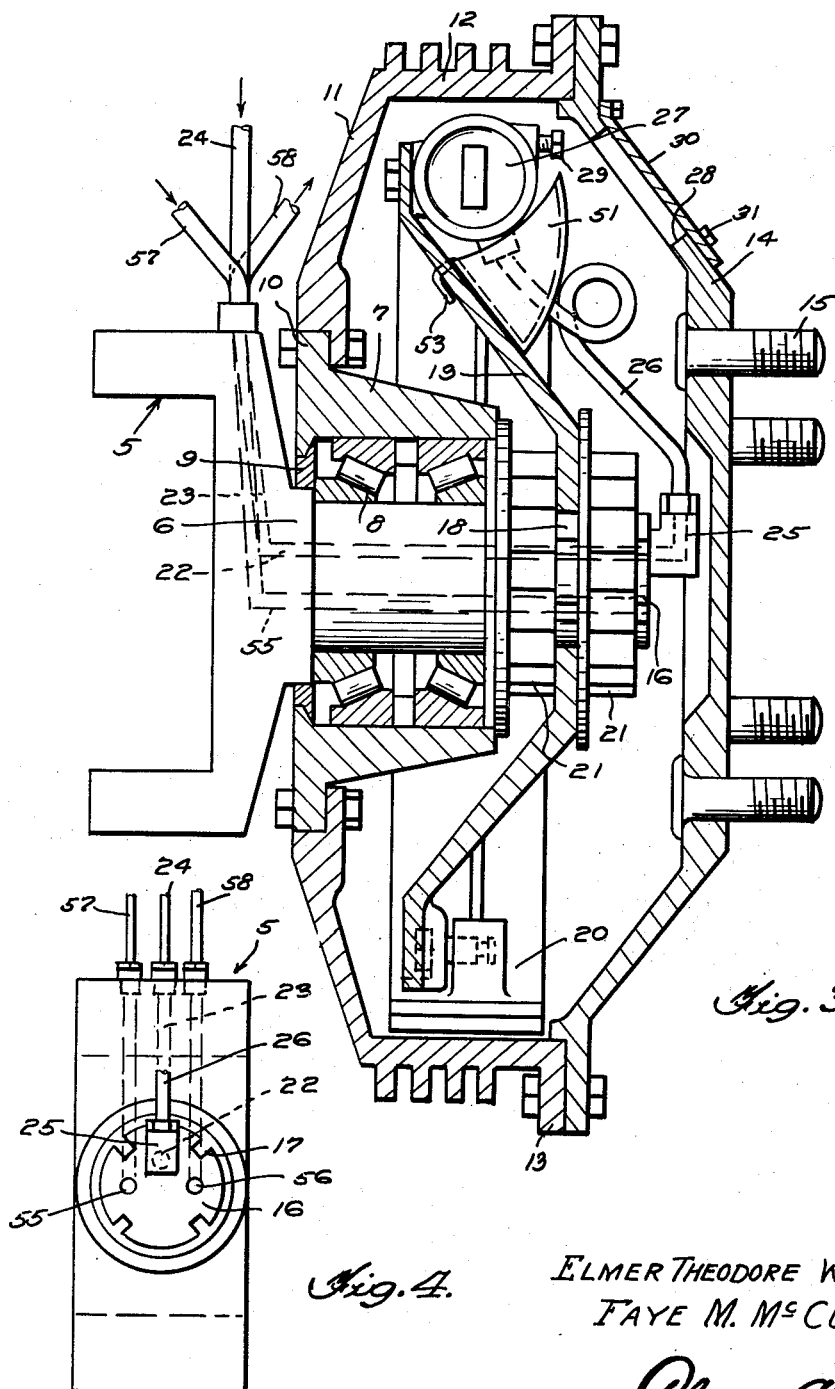

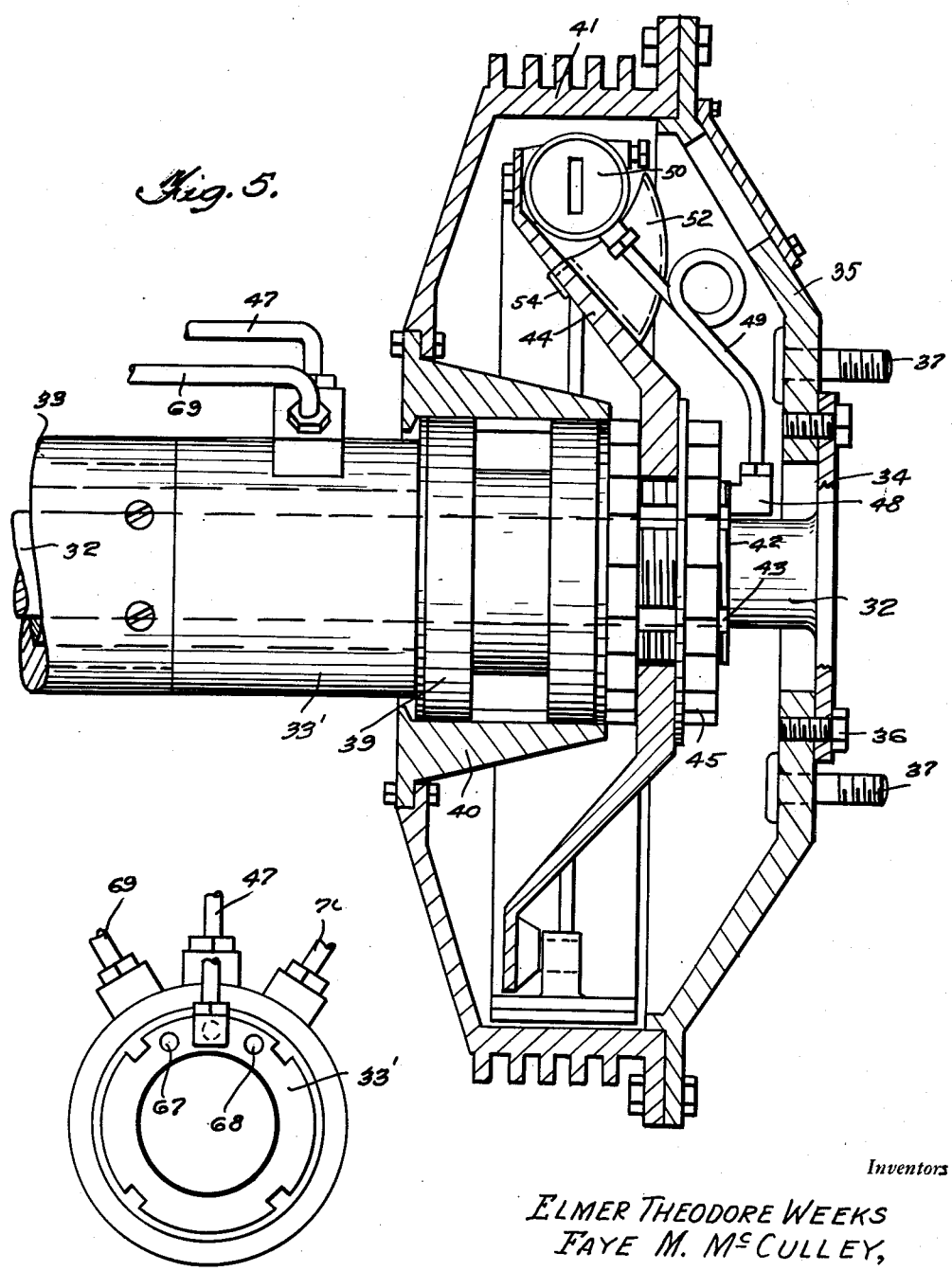

Aug. 15, 1944.   E. T. WEEKS ET AL   2,356,111
VEHICLE WHEEL BRAKE
Filed May 9, 1942   5 Sheets-Sheet 4

Inventors
ELMER THEODORE WEEKS
FAYE M. McCULLEY,

By Clarence A. O'Brien

Attorney

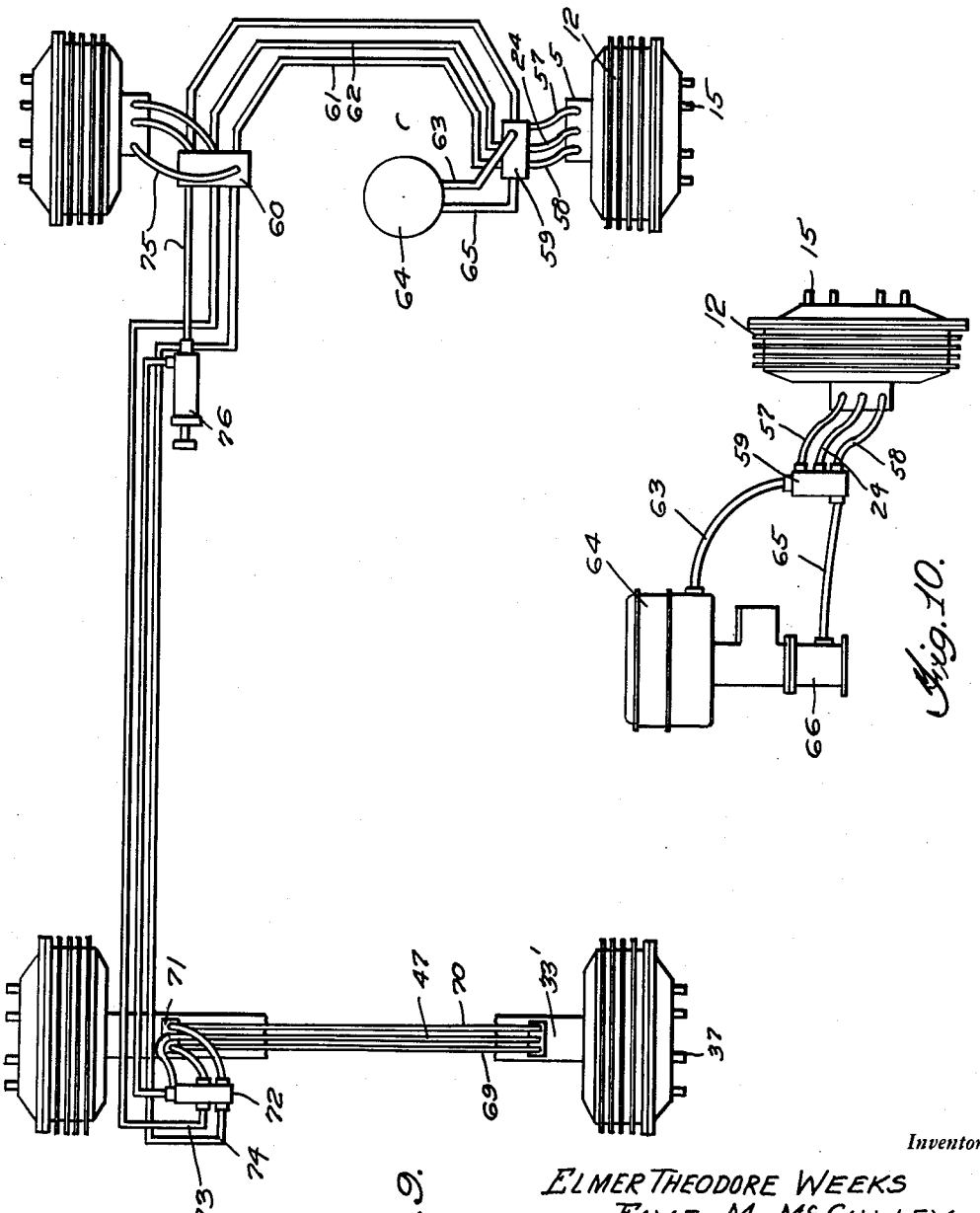

Patented Aug. 15, 1944

2,356,111

UNITED STATES PATENT OFFICE 2,356,111

VEHICLE WHEEL BRAKE

Elmer Theodore Weeks and Faye M. McCulley,
Scott Bar, Calif.

Application May 9, 1942, Serial No. 442,354

3 Claims. (Cl. 188—264)

The present invention relates to new and useful improvements in vehicle wheel constructions of a type disclosed in our prior Patent No. 2,267,225, dated December 23, 1941, and the present invention has for its primary object to provide a cooling system for the interior of the brake drum whereby to provide for the more efficient operation of the hydraulic brake system.

A further object is to provide a vehicle wheel construction and cooling system therefor, which is efficient and reliable in performance, relatively inexpensive to manufacture, and install in operative position on the automobile and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 3 is a vertical transverse sectional view.

Figure 4 is an end elevational view of the front wheel spindle showing the connection for the hydraulic brake system and cooling system connected thereto.

Figure 5 is a vertical transverse sectional view of one of the rear wheels.

Figure 6 is an end elevational view of the axle for the rear wheel showing the connection for the hydraulic brake system and air cooling system therefor.

Figure 9 is a diagram of the system for the hydraulic brake and air cooling means, and Figure 10 is a detail showing the connection of the air cooling system with the air filter of the engine.

Figure 2:
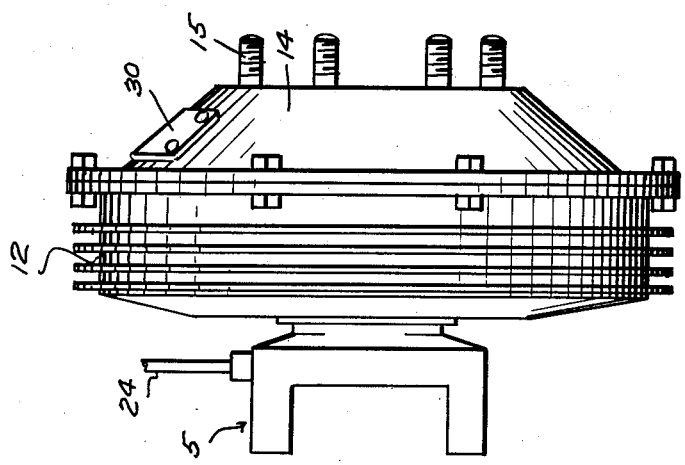
Figure 2 is an edge elevational view thereof.
Figure 1:
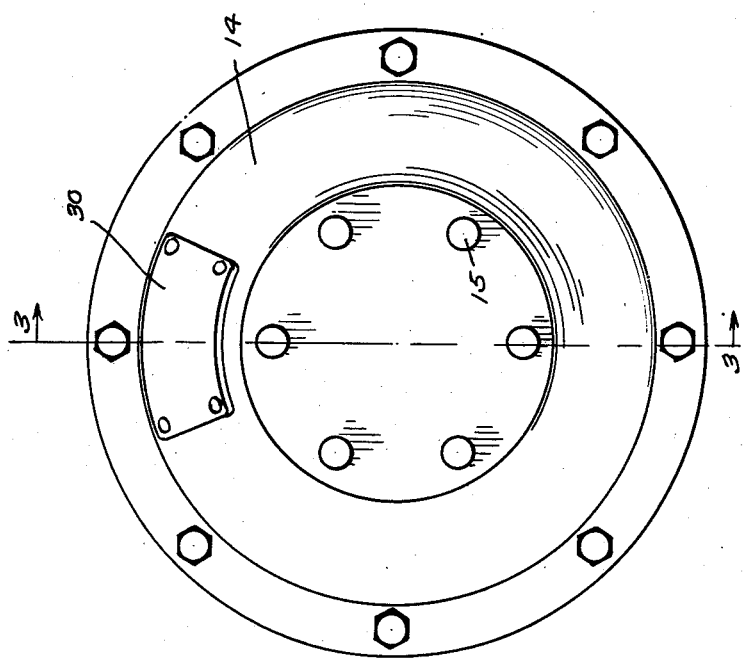
Figure 1 is a side elevational view of a vehicle wheel drum equipped with our invention.

Referring now to the drawings in detail, wherein for the purpose of illustration we have disclosed a preferred embodiment of the invention, and with particular reference to Figures 1 to 4, inclusive, the numeral 5 designates the fork-shaped spindle shoulder on which the spindle 6 is formed for the front wheel hub, designated generally at 7. Between the spindle and the hub is the usual roller bearing assembly 8, at each end of which is the grease-retaining washers 9. The inner end of the hub is formed with a flange 10 to which is secured the inner wall 11 of the brake drum 12.

The outer end of the brake drum is provided with an outwardly extending flange 13 to which is flatwise secured the cover plate 14 having a central portion provided with the circumferentially arranged lugs 15 on which the vehicle wheel (not shown) is secured in the usual manner.

The outer end of the spindle 6 is provided with a reduced threaded extension 16 having longitudinally extending grooves 17 formed therein for receiving the tongues 18 projecting inwardly of the central opening in the backing plate 19 on which the brake shoes 20 are pivotally mounted in the usual manner. The central opening in the backing plate is adapted to receive the threaded extension 16 of the spindle, and the tongue and groove connection between the backing plate and the spindle secures the backing plate against rotation. The backing plate is secured in position by means of a nut 21 threaded in the reduced extension 16.

Extending axially of the spindle 6 is the passage 22, the inner end of the passage terminating in a lateral extension 23 formed in the spindle shoulder 5 and to which the hydraulic brake line 24 is attached. The outer end of the passage is provided with an L-fitting 25 to which a pipe 26 is attached leading to the brake cylinder 27 of conventional construction for operating the free ends of the brake shoes 20, as shown to advantage in Figure 3 of the drawings. The cover plate 14 is provided with an opening 28 in a convenient position to provide access to the bleeder 29 of the brake cylinder, the opening being normally closed by means of a removable plate 30 secured in position by bolts 31.

From the foregoing, it will be apparent that the brake shoes 20 and the internal brake surface of the drum 12 are completely enclosed and substantially air-tight so as to prevent the entrance of foreign matter which might affect the efficient operation of the brake.

Figures 7, 8:
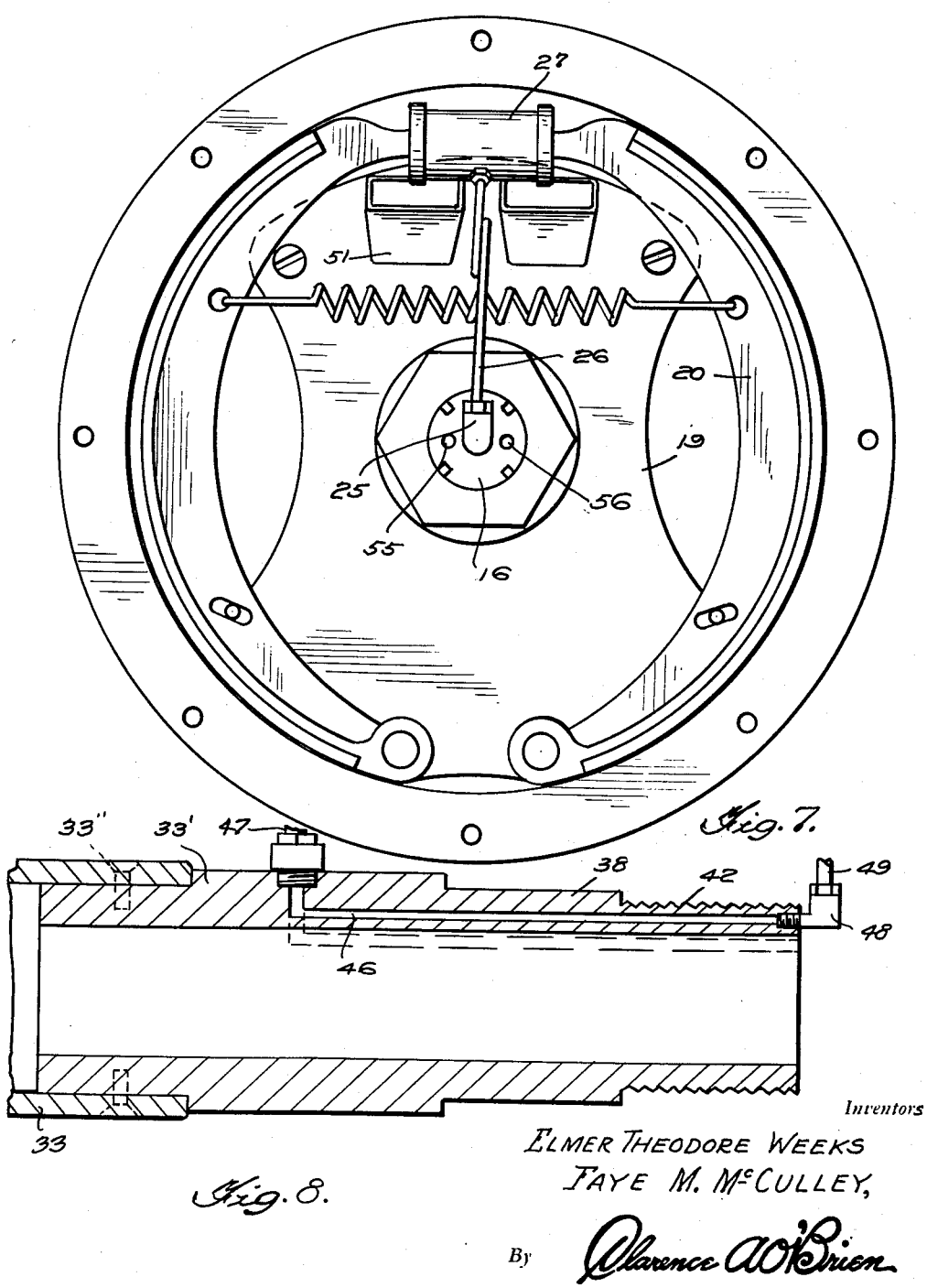
Figure 7 is a view in elevation of the interior of the front wheel showing the dust collecting cup for the hydraulic brake cylinder.
Figure 8 is a fragmentary longitudinal sectional view of the axle housing extension for one of the rear wheels.

In Figures 5 to 8, inclusive, we have illustrated the wheel construction forming our invention applied to the rear axle 32 of a motor-driven vehicle, which is generally provided with the axle housing 33 and within which the axle is freely rotatable. The rear axle housing 33 is formed with a tubular extension 33' having a telescoping connection and secured in position by bolts 33".

The outer end of the axle is formed with a flange 34 to which the central portion of the cover plate 35 is secured by means of bolts 36. The cover plate is provided with the usual wheel attaching bolts 37.

The axle housing extension 33' is reduced, as shown at 38, on which the roller bearing assembly 39 is mounted, the wheel hub 40 being positioned on the bearing assembly. To the hub is secured the brake drum 41 to which the cover plate 35 is attached, as heretofore explained.

Outwardly of the reduced portion 38 is the externally threaded reduced extension 42 having the longitudinally extending grooves 43 formed therein for securing the backing plate 44 against rotation, the backing plate being secured by the nut 45.

The extension 33' is formed with a passage 46 to the outer end of which is connected the brake line 47 and the passage at its inner end is connected by means of an L-fitting 48 with a pipe 49 leading to the brake cylinder 50.

Connected to the backing plate 19 of the front wheel and to the backing plate 44 of the rear wheel are dust-collecting cups 51 and 52, respectively, the cups being positioned under the ends of the respective brake cylinders and are secured in position to their respective backing plates by tongues 53 and 54 inserted through openings (not shown) in the backing plate and bent downwardly, as shown to advantage in Figures 3 and 5 of the drawings.

The spindle 6 of the front wheel is also formed with an air feed passage 55 communicating at the end of the spindle with the interior of the brake drum and is also provided with a return passage 56 likewise communicating at the outer end of the spindle with the interior of the brake drum. Flexible hose 57 and 58 are connected to the respective passages 55 and 56 and lead to front distributor casings 59 and 60 mounted on the automobile adjacent the respective front wheels, the distributor casings being connected to each other by hose lines 61 and 62. An air hose 63 connects the air filter 64 of the automobile engine with the distributor 59 for connection with the air hose 57, while an air hose 65 connects the distributor casing 59 with the intake manifold 66 of the engine, the hose 65 being in communication with the hose 58, whereby it will be apparent that air, after entering the filter 64, will pass into the wheel drum and be drawn therefrom into the intake manifold 66, the cool air thus passing through the drum serving to cool the same.

The rear axle housing extension 33' is also provided with intake and discharge air passages 67 and 68 communicating with the interior of the rear brake drum, the passages 67 and 68 having air hose 69 and 70 connected respectively thereto and leading to distributor casings 71 and 72 mounted adjacent the rear end of the automobile.

Air pipes 73 and 74 lead from the rear distributor casings forwardly to the front distributor casing 60, which provides connection for the air pipe to the air filter and intake manifold, as will be apparent from an inspection of Figure 9 of the drawings.

The several distributor casings also provide connection for the hose 75 leading from the respective brakes to the master cylinder 76 of the hydraulic brake system.

From the foregoing, it will be apparent that an air circulation system is provided for each of the brake drums to effectively cool the same and prevent overheating of the brakes.

It is believed the details of construction, operation and advantages of the device will be readily understood from the foregoing without further detailed explanation.

Having thus described the invention what we claim is:

1. In combination, a vehicle wheel including a hollow brake drum, an axle for the wheel having air intake and return passages therein communicating with the drum, and means connected to the passages of the axle for circulating air through the drum.

2. In combination, a vehicle wheel including a hollow brake drum, an axle for the wheel having air intake and return passages therein communicating with the drug, an engine intake manifold having an air filter attached thereto, and means connecting the air passages of the axle to the manifold and to the filter for circulating air through the drum.

3. In combination, a vehicle wheel including a hollow brake drum, an axle for the wheel having air intake and return passages therein communicating with the drum, an engine intake manifold having an air filter attached thereto, a fluid distributor casing, air hose connecting the passages of the axle to the casing, and air hose connecting the casing to the manifold and to the filter for circulating air through the brake drum.

ELMER THEODORE WEEKS.
FAYE M. McCULLEY.